T. B. De FOREST & T. S. GILBERT.

Assignor, by mesne assignments, to R. N. BASSETT.

Skirt-Hoop.

No. 8,378. Reissued Aug. 20, 1878.

Witnesses.

T. H. Harrah.

Wm J Sawyer.

Inventors.

Thos B. McForest and Thos S. Gilbert by their attorneys

Dickerson & Brennan

N. PETERS, PHOTO-LITHOGRAPHER, WASHINGTON, D. C.

UNITED STATES PATENT OFFICE.

THOMAS B. DE FOREST AND THOMAS S. GILBERT, OF BIRMINGHAM, CONN., ASSIGNORS, BY MESNE ASSIGNMENTS, TO ROBERT N. BASSETT, OF SAME PLACE.

IMPROVEMENT IN SKIRT-HOOPS.

Specification forming part of Letters Patent No. 74,672, dated February 18, 1868; Reissue No. 5,334, dated March 25, 1873; Reissue No. 8,378, dated August 20, 1878; application filed July 16, 1878.

*To all whom it may concern:*

Be it known that we, THOMAS B. DE FOREST and THOMAS S. GILBERT, of Birmingham, in the county of New Haven and State of Connecticut, have invented a new Improvement in the Manufacture of Hoop-Skirts; and we do hereby declare the following, when taken in connection with the accompanying drawing and the letters of reference marked thereon, to be a full, clear, and exact description of the same, and which said drawing constitutes part of this specification, and represents, in—

Figure 1:
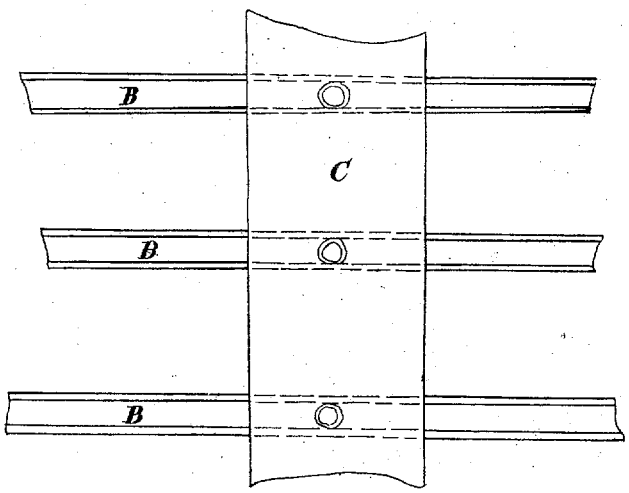
Figure 2:
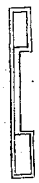

Figure 1, a front view of one of the vertical tapes with three springs attached; Fig. 2, a section of one of the springs enlarged; and in Fig. 3, a like section of a different construction.

This invention relates to an improvement in the manufacture of skirts composed of a series of springs attached to vertical tapes, and well known as "hoop-skirts," the object being to produce a lighter and cheaper skirt than has heretofore been done; and the invention consists in inclosing one or more elastic wires within a covering, the said covering being, when sized, folded, and pressed, of greater width than the spring, so that, while it confines the spring to its proper position within the covering, it gives to the spring the appearance of being made from a much broader wire than it in reality is, and admits of securing the springs to the vertical tape by means of a metallic fastening passing through both the vertical tape and the material covering the spring.

In order to the clear understanding of our invention, we will proceed to describe the same as illustrated in the accompanying drawing.

In Fig. 2 we represent the spring as two flat wires inclosed within the same covering, the wires being denoted in black.

Various devices may be employed in covering the two wires. One, and we think practically the best, is to take a narrow strip of fabric sufficient in width to surround the two wires, and form the space between the two; then the two wires with the fabric are drawn through an apparatus prepared for the purpose, the fabric being sized with any adhesive material, and the wires sustained equidistant from each other, the apparatus folding the fabric over the wires and pressing it down into the space between, the sizing being sufficient, or other sizing being added, so that when thoroughly dried the wires will be sustained at their given distances from each other, one wire at each edge of the folded fabric. The wires may be very light and the fabric equally light, and, when completed, the article produced has the appearance of a broad spring.

Figure 3:
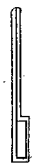

Instead of the two springs, as seen in Fig. 2, a single spring may be inserted, as in Fig. 3, and the fabric guided and folded so as to leave an edge, A, of fabric upon the spring, as denoted in said Fig. 3. This folded edge, being sized and pressed, secures the wire in its position in like manner as first described, and gives the like appearance of a broad spring, the sizing in all cases being sufficient to sustain that portion of the fabric at the edge of the wire or between the wires; or, if preferred, and to give more material at the edge, a single spring may be inserted at one edge and a cord at the other edge.

To construct a skirt from springs thus formed I pass the springs B through the pocket in the vertical tape C in the usual manner; then insert an eyelet or other suitable metallic fastening through the vertical tape and through the fabric of the covering of the spring, as denoted in Fig. 1, and this may be done on the former, and the same means which secure the springs in the vertical tape may also lock the two ends of the spring within the pocket of the tape.

A skirt constructed in this manner has every appearance of one having strong springs, but is much lighter than the ordinary skirts, as the wire employed for the spring may be much lighter than that used in the ordinary manner, and the manner of attaching the parts together is of the strongest possible character. Other wires may be added to increase the width, but forming a space in like manner between each two.

We do not wish to be understood as broadly claiming the introduction of two or more springs into a fabric, as such is not new; but in cases where it has been done the fabric has been first formed into pockets for the reception of the springs, and the springs themselves covered separately and independently of the said pockets. This arrangement is seen in several well-known patents for the whole or lower portion of a skirt.

It will be observed that we do not in any way form a pocket in the fabric, the covering being simply a folded fabric, the folds being secured by strong sizing and pressed hard together.

Having thus fully described our invention, what we claim as new and useful, and desire to secure by Letters Patent, is—

1. A skirt-hoop formed of one or more wires inclosed within a covering, which not only envelops and protects the wire, but forms an edge, A, or connection B, substantially as and for the purpose specified.

2. A skirt-hoop formed of one wire inclosed within a covering, which not only envelops and protects the wire, but forms an edge, A, substantially as and for the purpose specified.

THOS. B. DE FOREST.
THOMAS S. GILBERT.

Witnesses:
I. D. BREWSTER,
C. BREWSTER, Jr.